United States Patent [19]
Heinz et al.

[11] Patent Number: 5,816,820
[45] Date of Patent: Oct. 6, 1998

[54] SIMULATION GENERATION SYSTEM

[75] Inventors: William Heinz, Oregon House; David Ray Stockwell, Grass Valley, both of Calif.

[73] Assignee: Kelly Properties, Inc., Troy, Mich.

[21] Appl. No.: 710,666

[22] Filed: Sep. 18, 1996

[51] Int. Cl.[6] .............................. G09B 19/00; G06F 3/00
[52] U.S. Cl. ......................... 434/118; 395/500; 345/418; 345/501
[58] Field of Search ............................ 395/500; 345/418, 345/302, 501, 523, 326–358; 434/118

[56] References Cited

U.S. PATENT DOCUMENTS

| | | | |
|---|---|---|---|
| 4,772,206 | 9/1988 | Kerr et al. | 434/118 |
| 5,317,688 | 5/1994 | Watson et al. | |
| 5,395,242 | 3/1995 | Slye et al. | 434/43 |

FOREIGN PATENT DOCUMENTS 002271013  3/1994  United Kingdom ................... 434/118

OTHER PUBLICATIONS

Fast Start for Lotus 1–2–3 by Wallace Judd; McGraw–Hill © 1985; p. 8.
Shelley Authoring System; ComTrain, Inc. by Wallace Judd © 1987; pp. 2–5.
101 Uses for Software Robot; Automator mi by Direct Technology Limited © 1986.
The Judd Test for 1–2–3 skills © 1991 by Mentrix Corp.
KO–Pilot for WordPerfect by Richard Getler and Chris Skelly © 1988.
Explaining "Teaching Machines" and Programming by David Cram © 1961 pp. 8 and 38.
Practical Programming by Peter Pipe © 1977 p. 6.
Klystrom Principles by Robert Kantor and Peter Pipe © 1963.
Windows 95 Journaling and Playback, "Using Keyboard and Mouse Macros Anywhere and Anytime", Dr. Dobb's Journal, Mar. 1996.
Mentrix Software Skills Testing, "The 'QT (Quick Test) Authoring System' for Windows from Mentrix® Corporation", Version 1.0, © 1993 by Mentrix Corporation.

*Primary Examiner*—Richard J. Apley
*Assistant Examiner*—John Edmund Rovnak
*Attorney, Agent, or Firm*—Harness, Dickey & Pierce, P.L.C.

[57] ABSTRACT

A method of generating a simulation of a visual display of a computer session, includes the step of recording a visual display of a computer session by providing a journal record hook in binary format. Each message associated with each input from a computer input device is then recorded. After each message, the screen is checked for screen changes associated with each input from the computer input device and if detected, location coordinates of a screen change location are recorded and a detected screen change is copied as a bitmap. Cursor changes associated with each input from a computer input device are checked, and if detected, a cursor identification is recorded. The recorded visual display is then played back by providing a journal playback hook in binary format. An invisible window is then created to draw on and each recorded message is played back. It is also determined if there is a corresponding recorded cursor change and a corresponding screen change. Any corresponding bitmapped screen changes are read to the recorded location on the screen associated with each recorded message and the cursor identification to be displayed on the screen is switched for any recorded cursor changes associated with each recorded message.

15 Claims, 4 Drawing Sheets

*Flow Chart of Record Mechanism*

*Flow Chart of Playback Mechanism*

*Example of DCF File*

SIMULATION GENERATION SYSTEM

BACKGROUND OF THE INVENTION

1. Field of the Invention

The present invention relates to a simulation generation system, particularly, a simulation generation system designed to allow the user to record an "animation" of a session at the computer that can be played back at a later date. The animation should play back regardless of the screen resolution, and whether or not the application from which the recording was made exists on the machine.

2. Description of Background Art

There is a large number of computer software applications in popular use today. Examples include word processing programs, spreadsheet programs, drawing programs, financial accounting programs, and the like. Many of the these programs are mass marketed and are frequently updated, at least once a year.

This presents a practical problem for many users. Learning a software application takes time. Some users are reluctant to upgrade to a new software application version, if it will mean having to relearn what they already know how to do. The motivation for upgrading to a new version is usually to gain added features. Regardless of the motivation, however, when a user upgrades to a new version of a software application, he or she typically must learn the new features as well as any changes made to existing features. While users' manuals and aftermarket books can help the user get over the learning curve, many users do not enjoy looking up things in books.

Grappling with the training issue is particularly important for the temporary service industry. Temporary service agencies provide employees on a part-time basis to businesses which need temporary help. The temporary employee needs to be trained in advance, so that he or she is fluent in the software applications used by the temporary employer. The applicant's assignee has done a considerable amount of work in this area and has discovered that automated training and testing systems can be more effective for training its employees for the tasks they will encounter on the job. In addition, automated systems can also provide a testing function. The user's skills can be evaluated and a report generated, for use in selecting persons who best qualify for a particular job assignment.

Many conventional automated training systems are nothing more than simulators. These are applications which simulate the user interface and software application functions of a given software application program. Being a simulation, however, the actual software application is not actually being run. Using a simulation training system, the trainee is taken through a series of tests, and the training program records the results. Some simulation programs also provide a few pre-planned demonstrations on particular software application features. For example, a pre-planned demonstration might show the user how to create a chart in a spreadsheet program. The demonstration, however, is not an actual demonstration of the software application in execution, but rather merely a series of graphical displays designed to give the appearance of the software application in actual operation.

While conventional simulation programs display static or non-animated images, such as pull down menus and dialog boxes, with a fairly realistic presentation, the same is not true for dynamic or animated displays, such as a moving cursor. Presenting a moving cursor as a rapid sequence of individual frames tends to produce an unnatural or jerky animation. Moreover, the need to display a large number of frames to produce an animated cursor movement sequence taxes the computer system memory and processor resources.

In an effort to overcome the shortcomings of current simulation programs, some have experimented with using an actual working copy of the software application being taught to the user. While this approach may overcome some of the problems of simulation programs, the approach introduces other problems. For example, in order to use an actual working copy of the program being taught to the user, it is necessary to ensure that the program is placed in a known initial state (i.e. all settings, preferences, and options are set to a known state). Otherwise, the training sequence may not work as originally intended. Also, use of actual working copies of the program can require extensive resources. Training systems will need to have sufficient disk space and random access memory to run each of the applications being taught, and the appropriate number of licenses must be secured. In classroom training situations, these costs can be considerable.

Another problem with simulation training programs is that they are difficult to keep up to date. As noted above, mass marketed software applications are frequently updated. This means that each time the application is updated, a new simulation program may need to be constructed. The problem is further heightened by the occasional interim release upgrade, distributed by the software application manufacturer to correct a bug. Due to the time required to construct accurate simulation programs, it is not often practical to maintain the simulation program in synchronization with the software application which it is designed to mimic. Accordingly, it is desirable to provide a simulation generation system which would allow an author of a simulation training program to record an "animation" of a session at the computer that can be played back at a later time, and specifically, for simulating the user interface and software application functions of a given software application program.

SUMMARY OF THE INVENTION

Accordingly, it is an object of the present invention to provide a simulation generation system which will allow the user to record an "animation" of a session at the computer that can be played back at a later date.

It is an object of the present invention to provide a simulation generation and playback system that will supply training and testing of essentially any software application, without requiring the software application to be resident on the system, while nevertheless providing smooth and natural appearing motion sequences, such as moving cursor operations.

It is a further object of the present invention to provide a simulation generation system which will play back an animation regardless of the screen resolution, and whether or not the application from which the recording was made exists on the machine.

It is yet another object of the present invention to provide a simulation generation system which is easy to use.

It is a further object of the present invention to provide a simulation generation system which creates simulation files which are as small as possible and which are easy to modify.

These and other objects of the present invention are obtained by providing a method of generating a simulation of a visual display of a computer session, including the steps of recording a visual display of a computer session by:

providing a journal record hook in binary format; recording each message associated with each input from a computer input device; checking for screen changes associated with each input from the computer input device and if detected, recording location coordinates of a screen change location and copying a detected screen change as a bitmap; checking for a cursor change associated with each input from a computer input device and if detected, recording a cursor identification. The recorded visual display is then played back by providing a journal playback hook in binary format. An invisible window is then created to draw on and each recorded message is played back. It is also determined if there is a corresponding recorded cursor change and a corresponding screen change. Any corresponding bitmapped screen changes are read to the recorded location on the screen associated with each recorded message and the cursor identification to be displayed on the screen is switched for any recorded cursor changes associated with each recorded message.

The WINDOWS API provides journal playback and journal record capabilities. The purpose of these API's is to make it possible to record a series of messages and play them back at a later date. When using the journal record mechanism, the time associated with a message is recorded along with the message. This makes it possible to play back the messages at the same speed that they were recorded or to alter the speed so that it plays back either faster or slower than recorded. This mechanism is used primarily for playing keystrokes or mouse actions back into a running application.

The simulation generation system uses the journal record/playback capabilities with an added feature. In addition to recording the keystrokes and mouse movements, they will associate with each message a bitmap that reflects any changes that occurred to the screen since the previous message. In this way, it will be possible to play back the messages and as each message plays to update the screen thereby simulating the application that was recorded. The full screen bitmap will need to initialize the screen before each play so that thereafter it is only necessary to record the screen changes.

In addition to a bitmap, a cursor change may also be associated with the message. Cursors for each application to be simulated are stored ahead of time in the simulation generation program. During the record session, the system determines if a cursor has changed. If so, an identification code for the new cursor is stored in association with the message.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only and thus are not limitative of the present invention, and wherein.

DETAILED DESCRIPTION OF THE
PREFERRED EMBODIMENTS

The present invention relates to a simulation generation system designed to allow a user to record an "animation" of a session at the computer that can be played back at a later time. The simulation generation system is ideally suited for use in creating a preplanned demonstration for simulation training programs.

Figure 1:
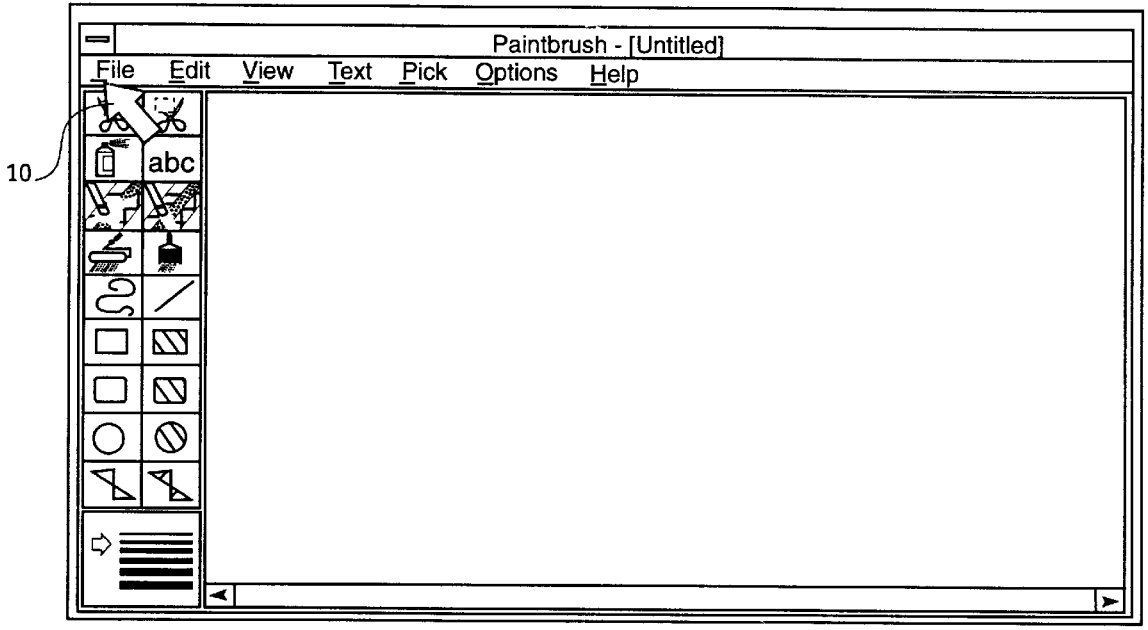
FIG. 1 is an exemplary user interface diagram which would be copied as a full screen bitmap needed to initialize the screen for a pre-planned demonstration in a simulation training program.
Figure 2:
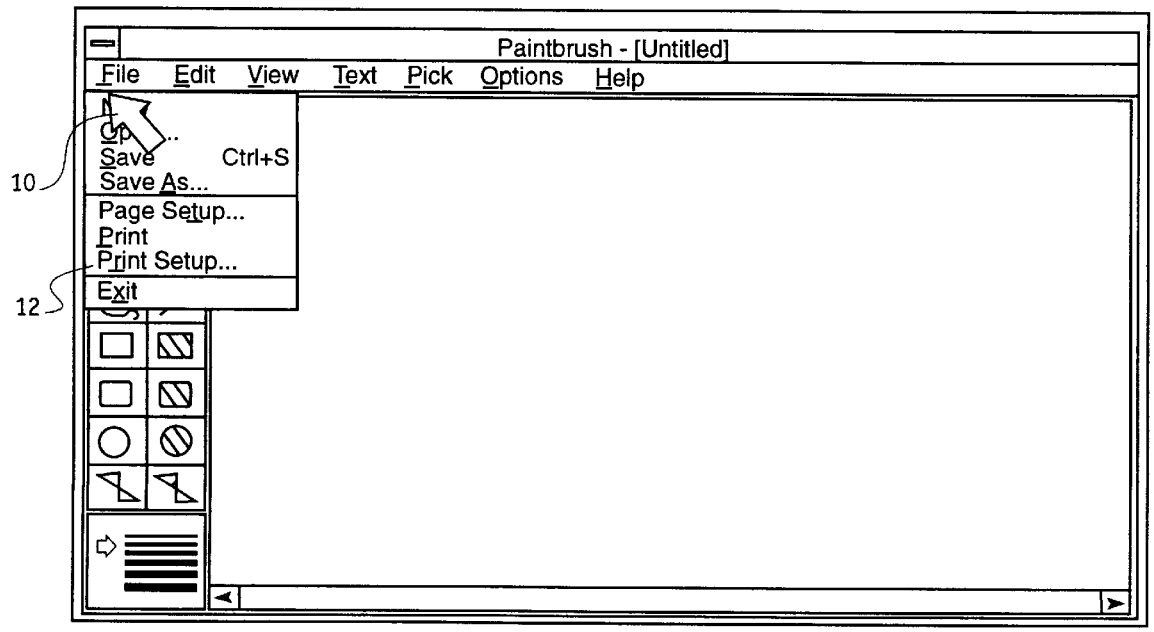
FIG. 2 is a user interface diagram depicting a computer screen when a sample task has been performed.

A sample user interface diagram is shown in FIG. 1 for a PAINTBRUSH application which is commonly used through WINDOWS software. FIG. 1 includes the initial screen which is provided when the PAINTBRUSH application is accessed. The cursor 10 is shown pointing to the "file" option. In FIG. 2, the resultant screen is shown when the mouse is clicked in order to select the "file" option. On the screen, a pull down menu, which includes several options, is displayed. FIGS. 1 and 2 will be used in conjunction with the following detailed description of the present invention in order to illustrate the utility of the invention.

The WINDOWS Application Programmer Interface (API) provides journal playback and journal record capabilities. The purpose of these API's is to make it possible to record a series of messages and play them back at a later date. When using the journal record mechanism, the time associated with a message is recorded along with the message. This makes is possible to play back the messages at the same speed that they were recorded or to alter the speed so that it plays back either faster or slower than recorded. This mechanism is used primarily for playing keystrokes or mouse actions back into a running application.

The simulation generation system according to the present invention uses the journal record/playback capabilities with an added feature. In addition to recording the keystrokes and mouse movements, it will associate with each message a bitmap that reflects any changes that occurred to the screen since the previous message. In this way, it will be possible to play back messages and as each message plays, to update the screen thereby simulating the application that was recorded. A full screen bitmap is needed to initialize the screen before each play so that thereafter it is only necessary to record the screen changes.

In addition to a bitmap, a cursor change may also be associated with the message. Cursors for each application to be simulated are stored ahead of time in the simulation generator program. During the record operation, the system determines if the cursor has changed.

The simulation generation system of the presently preferred embodiment stores data into a number of files. A description of the files according to a preferred embodiment of the present invention are provided below. For each recording session, the names of the files will have the same prefix but a different suffix. The prefix will be different for each recording.

The function of the files and the file extensions is listed below:

| FILE EXTENSION | FUNCTION OF FILE |
|---|---|
| GHO | Header followed by messages in binary format collected from journal record hook. |
| GHS | Copy of GHO file used for playing back simulation. |
| MTB | Message table - (flags whether there is a bitmap or a cursor change associated with the message). If there is a cursor change, the high seven bits of the byte contain the cursor number. |
| DCF | ASCII file with position and name of each bitmap to be displayed. |
| nnn | nnn represents a number. Bitmaps are stored in BMP format. The initial screen bitmap has an extension of zero. The next bitmap in the sequence has a number of one, and each following bitmap has an extension that reflects the sequence. |
| Cursor Table | Associates an ID with each cursor used by the application. |

Figure 3:
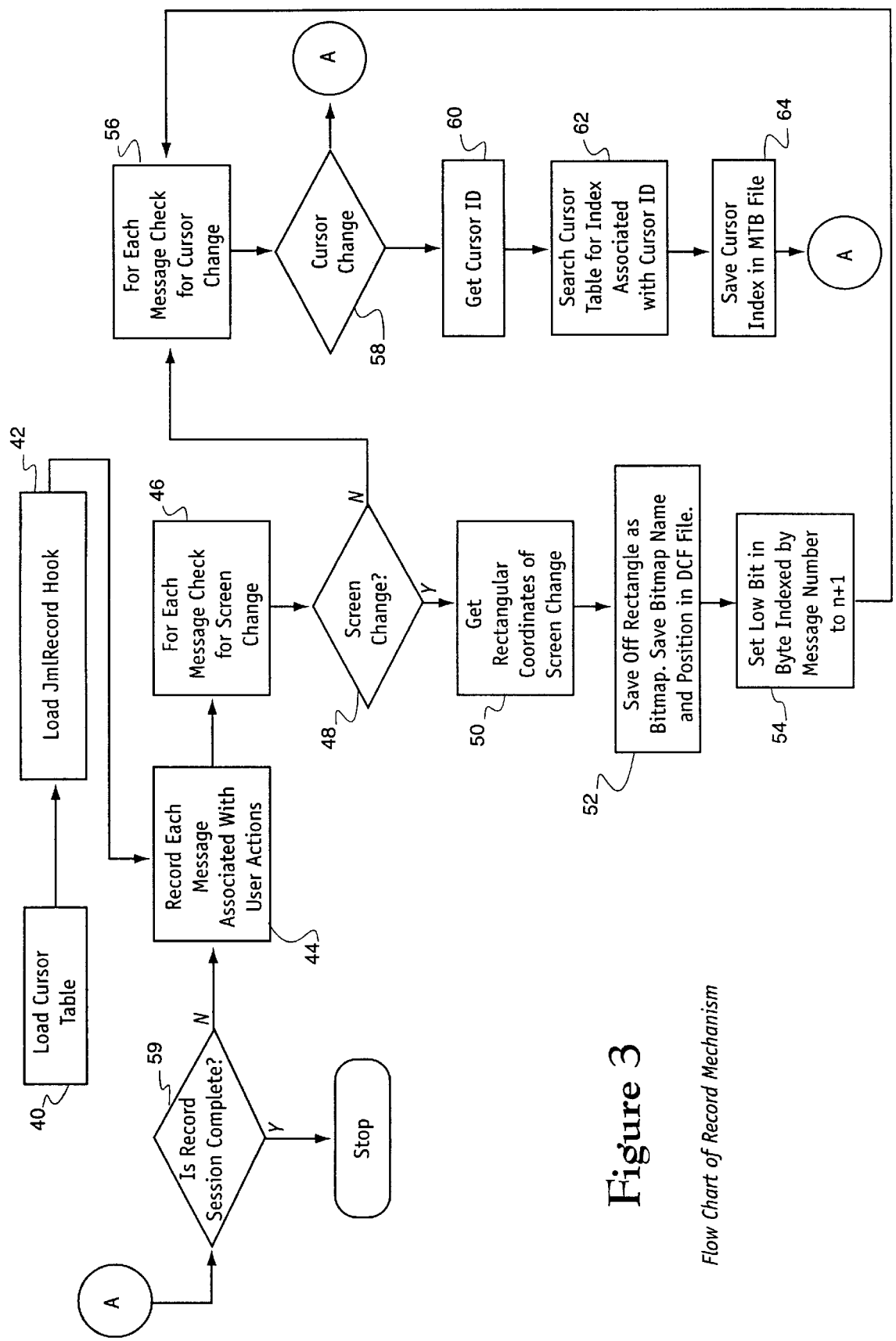
FIG. 3 is a flow chart illustrating the steps for recording an animation of a session at the computer according to the principles of the present invention.

After recording an animation, each of the above files will be compressed into one file using routines provided by COMPRESS PLUS, a product for sale by Micro Help in Atlanta, Ga. A flow chart of the record mechanism is provided in FIG. 3 and will be described in detail hereinbelow. First, the cursor table is loaded (40) which associates an ID with each cursor used by the application. A general record hook is then loaded (42) which activates WINDOWS journal record capability. Each message associated with user actions is then recorded (44). For each message, a check is made for screen changes (46) and (48). This is done by capturing the screen and checking every integer in the bitmap image starting from the top left of the image and continuing through the whole bitmap. The top difference, the left most difference, the bottom most difference and the right most difference is saved in memory and a rectangle is derived to go through those points. The bitmap representing this rectangle is then written out in bitmap format. As an additional feature, since it is possible that a single message can result in a tiny bitmap change at the top of the screen accompanied by a tiny bitmap change in the bottom of the screen, the screen can be divided into logical quadrants or sections and each section can be checked for a change in the same way that the whole screen is checked. In this way, a number of different tiny rectangles can be captured corresponding to each screen section for each message. This would greatly reduce disk space usage for applications where a tiny change occurs at both the top and bottom of the screen simultaneously as in the cases where the status bar changes every time you type a character.

If a screen change has been made, the program directs the computer to get the rectangular coordinates of that portion of the screen in which the screen change occurs (50). With respect to FIG. 2, an example of a screen change is shown including the pull down menu 12 in the upper left hand corner which appeared on the screen as a result of the mouse being clicked on the FILE option. The rectangular coordinates of the box 12 would be obtained in step 50. The image within the rectangular coordinates of the screen change is then saved as a bitmap in the DCF file (52). The low bit in the byte is then indexed by message number to n+1 (54). The flow proceeds to determine if there is a cursor change for each message (56). Cursor changes may be detected by the following technique. First, a program reads the application executable or DLL and creates a Resource file containing all cursors related to the application that is to be simulated. These cursors are then included in the resource file for the program that will record and playback the animation. In this way the cursors are stored and the application is not needed to access the cursors. At the same time a CURSOR TABLE is created that associates a cursor index (1–28) with the Cursor ID in the resource file. This process needs to happen only once for each application that is to be simulated.

Then, at record time, for each message that passes through the Journal Record callback routine, the Windows API "GetCursor" is called and the handle for the current cursor is returned. If this handle changes then the cursor has changed and the returned handle is the handle of the new cursor. A table in memory (NEW CURSOR TABLE) is then searched to see if this new cursor handle has been added and if not it is added so that a list of all new cursors is in memory along with their handle, their ID, if known, and the message number associated with the cursor change so that the MTB file can be updated before it is written out. The handle of the cursor, the message number of the recording and the Cursor ID are kept in the memory table but to this point the Cursor ID is not known and so the ID for this new cursor is initially set to NULL. At the end of the recording the ID for all new cursors must be resolved. This is done by going through each new cursor, displaying that cursor using the ShowCursor API and along side displaying all cursors in the CURSOR TABLE. The user selects a match and the index taken from the CURSOR TABLE is stored in memory in the NEW CURSOR TABLE. Finally, all cursor entries in the MTB file are updated using the NEW CURSOR TABLE so that the MTB file has the index for the new cursor and can then search the CURSOR TABLE to get the resource ID at playback time. When the animation is played back the cursor can then be displayed directly out of the resource file with a ShowCursor API.

As an additional feature, the matching of cursors can be done automatically be reading the cursors and comparing the bitmaps instead of forcing the author to make the match manually. Additionally, the cursors can be stored as cursor files instead of storing them in the resource file so that they can be easily changed if necessary after authoring is complete.

Also, in step 48, if a screen change has not been detected, the program flows directly to check for cursor changes (56). If no cursor change is detected at step 58, the program flows to step 59 to continue to record each message associated with user actions if the record session is not complete. If a cursor change is detected, a cursor ID is determined (60) and the cursor table is searched for the index associated with the cursor ID (62). The cursor index is then saved in the MTB file (64). The flow of the program returns to step 44 for recording each message associated with user actions. When the record session is complete (59), the files are preferably compressed into one file using routines provided by COMPRESS PLUS or other suitable compression software.

Figures 4, 5:
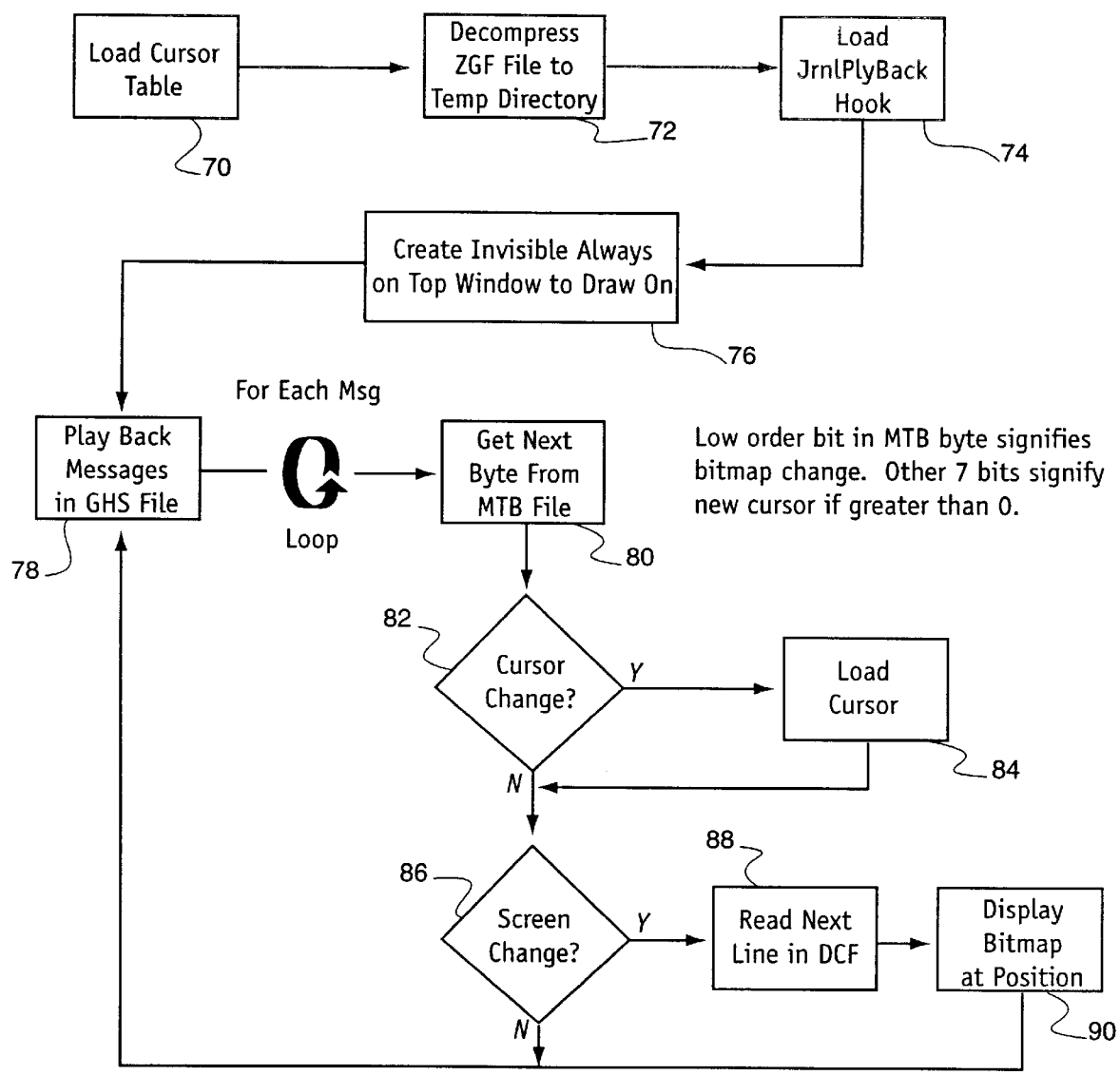
FIG. 4 is a flow chart illustrating the steps for playing back a recorded animation according to the principles of the present invention.
FIG. 5 illustrates an example ascii file with the position and name of each bitmap recorded during a record session.

The flow chart for the playback mechanism is shown in FIG. 4. Prior to playback, the cursor table is loaded (70). The compressed file is then decompressed into a temporary directory (72). A journal playback hook is then loaded (74) to access WINDOWS journal playback capability. An invisible window is created on top of the screen in order to display the recorded bitmapped images (76). The messages in the GHS file are then played back (78). The following loop is performed for each message in the GHS file. First the next byte from the MTB file is retrieved (80), and a determination is made as to whether there is a corresponding cursor change (82). If a cursor change has been saved in connection with the present message, the cursor index is loaded and the program flow returns to determine if a screen change has been recorded in association with the present message (86). Also, if no cursor change was detected in step 82, the flow continues to step 86. If a screen change has been recorded, the next line in the DCF file will be read (88) and the bitmap will be displayed at the recorded position (90). The program flow then returns to play back the next message through the GHS file and the loop is continued.

An example DCF file is shown in FIG. 5. In each file, the same suffix "xltask" is provided to designate the common record session, and the first numeral indicator after the decimal point indicates the sequence of the recorded bitmaps. The next four numerical indicators represent the rectangular coordinates of a screen change. The initial DCF file represented by sequence indicator zero records the bitmapped image of the entire screen. The recorded rectangular coordinates of the two remaining example DCF file indicate specific rectangular coordinates within the screen boundaries for the saved bitmap images.

The present invention can also be used to save the rectangular coordinates of several screen changes at different locations or to make a determination that so many changes have occurred to the screen that the entire screen should be copied as a bitmapped image.

Figure 6:
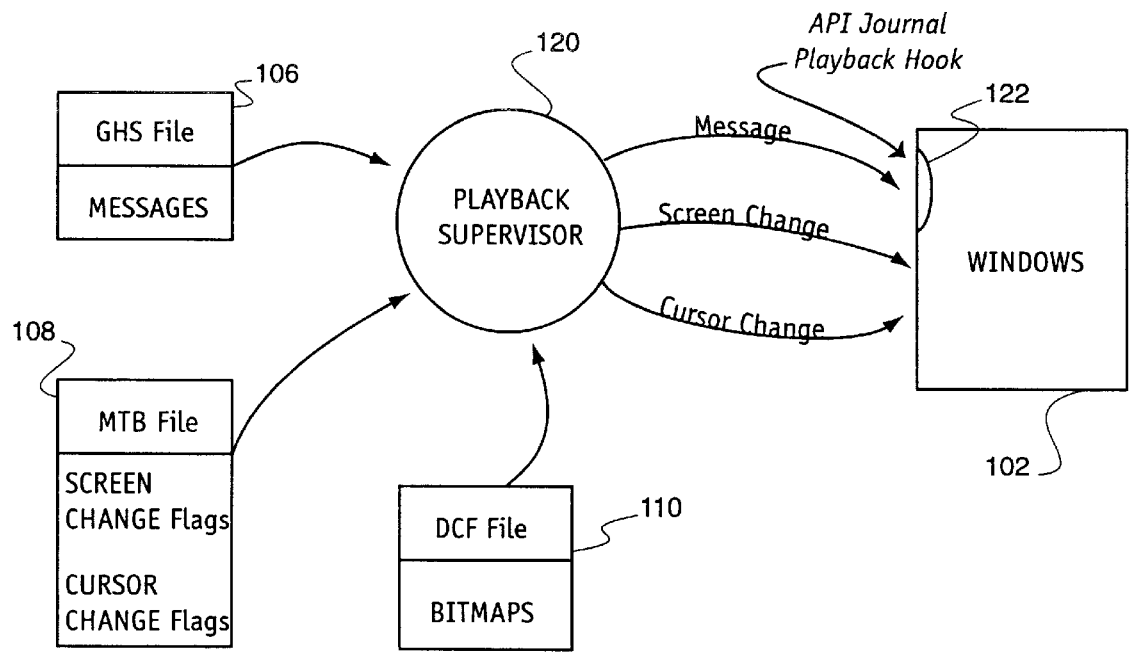
FIG. 6 is a data flow diagram of the play back mechanism according to the principles of the present invention.
Figure 7:
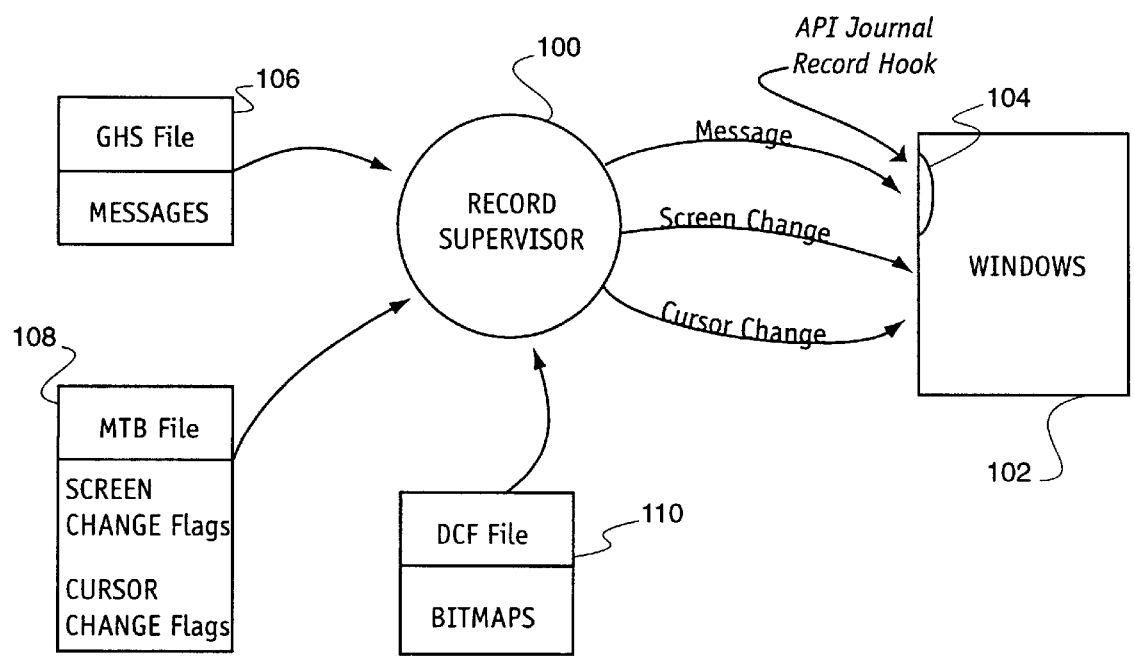
FIG. 7 is a data flow diagram of the record mechanism according to the principles of the present invention.

With reference to FIGS. 6 and 7, a data flow diagram is illustrated for the playback and record mechanisms, respectively. In FIG. 7, a record supervisor 100 is in communication with the WINDOWS operating system 102 of a computer. The record supervisor 100 receives messages through an API Journal Record hook 104, and the messages are recorded to the GHS file 106. The record supervisor 100 also determines if there are any screen changes or cursor changes associated with each of the recorded messages and if so, the record supervisor 100 will record a screen change flag and a cursor change flag to the MTB file 108. In addition to the cursor change flag, the record supervisor 100 will also record a cursor identification, in the form of a plurality of bits, along with the flag stored in the MTB file 108. Along with each screen change flag saved to the MTB file 108, the record supervisor 100 also will record the rectangular coordinates and a bitmapped image of the corresponding screen change to a DCF file 110.

With reference to FIG. 6, the playback mechanism will be described. In FIG. 6 a playback supervisor 120 is in communication with a WINDOWS operating system 102 of a computer. The playback supervisor 120 provides an API Journal Playback hook 122 with the WINDOWS operating system 102 and retrieves the stored messages from the GHS file 106. The playback supervisor then checks the MTB file 108 to determine if there is a screen change or cursor change flag associated with each message retrieved from the GHS file 106. For example, if the low order bit is set in that byte then there is a bitmap associated with the message and the next line of the DCF file 110 is read in order to get the name and position of the bitmap to be displayed. Furthermore, if there is a corresponding cursor change the identification of the cursor is retrieved from the MTB file 108. The playback supervisor 120 delivers each message and its corresponding screen change and cursor change to the WINDOWS operating system 102 so that each message can be carried out by the WINDOWS operating system 102 and each screen change and cursor change can be displayed on the display panel of the computer.

From the foregoing, it will be appreciated that the present invention combines the journal playback and record mechanism of the WINDOWS API with specially controlled bitmapped image displays. In this way, the WINDOWS operating system is used to simulate quickly moving sequences, such as cursor movements, while the bitmap display mechanism of the invention handles static or non-animated screen display changes. The invention coordinates the presentation of dynamically changing graphical elements, such as cursor movements, with static screen changes such as presentation of pull down menus and dialog boxes, while simultaneously ensuring that the proper cursor bitmap is appropriately displayed at all times. The invention thus allows essentially any software application to be simulated, without the need to actually run the software application. Cursor movements and other dynamically changing or animated sequences appear smooth and natural and the overall display window is continually provided with screen change updates, overlaid as required, utilizing processor and memory resources efficiently.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method of generating a simulation of a visual display of a computer session, comprising the steps of:
    recording a visual display of a computer session by:
        providing a journal record hook;
        recording each message associated with each input from a computer input device;
        checking for screen changes associated with each input from said computer input device and if detected, recording location coordinates of a screen change location;
        copying a detected screen change as a bitmap;
        checking for a cursor change associated with each input from a computer input device and if detected, recording a cursor identification; and
    playing back the recorded visual display by:
        providing a journal playback hook;
        creating an invisible window to draw on;
        playing back each recorded message and determining if there is a corresponding recorded cursor change and a corresponding screen change;
        reading any copied bitmap of screen changes to the recorded location on the screen associated with each recorded message; and
        switching the cursor identification to be displayed on the screen for any recorded cursor changes associated with each recorded message.

2. The method according to claim 1, further comprising the step of recording an initial screen display as a bit map at a start of a record session.

3. The method according to claim 2, wherein said recorded initial screen display is read to said invisible window at a start of a playback session.

4. The method according to claim 1, wherein said step of checking for screen changes associated with each input from said computer input device includes the step of checking every integer in a bitmap image and deriving a rectangle to go through a top difference, a left most difference, a bottom most difference, and a right most difference.

5. The method according to claim 1, wherein said step of checking for screen changes associated with each input from said computer input device includes the step of dividing a screen into sections and checking every integer in each section of a bitmap image and deriving a rectangle to go through a top difference, a left most difference, a bottom most difference, and a right most difference for each section.

6. A method of generating a simulation of a visual display of a computer session, comprising the steps of:

recording a visual display of a computer session by:
        providing a journal record hook;
        recording each message associated with each input from a computer input device;
        checking for screen changes associated with each input from said computer input device and if detected, copying said screen change as a bitmap; and playing back the recorded visual display by:
        providing a journal playback hook;
        creating a window to draw on;
        playing back each recorded message and corresponding recorded screen changes.

7. The method according to claim 6, wherein said step of checking for screen changes associated with each input from said computer input device includes the step of checking every integer in a bitmap image and deriving a rectangle to go through a top difference, a left most difference, a bottom most difference, and a right most difference.

8. The method according to claim 6, wherein said step of checking for screen changes associated with each input from said computer input device includes the step of dividing a screen into sections and checking every integer in each section of a bitmap image and deriving a rectangle to go through a top difference, a left most difference, a bottom most difference, and a right most difference for each section.

9. A method of generating a simulation of a visual display of a computer session, comprising the steps of:

recording a visual display of a computer session by:
        providing a journal record hook;
        recording each message associated with each input from a computer input device; and
        checking for screen changes associated with each input from said computer input device and if detected, copying said screen change as a bitmap.

10. The method according to claim 9, wherein said step of checking for screen changes associated with each input from said computer input device includes the step of checking every integer in a bitmap image and deriving a rectangle to go through a top difference, a left most difference, a bottom most difference, and a right most difference.

11. The method according to claim 9, wherein said step of checking for screen changes associated with each input from said computer input device includes the step of dividing a screen into sections and checking every integer in each section of a bitmap image and deriving a rectangle to go through a top difference, a left most difference, a bottom most difference, and a right most difference for each section.

12. A simulation generation mechanism for communication with an operating system of a computer, comprising:

a first data structure for storing messages input into a computer during a recording session;
    a second data structure for storing information relating to screen changes corresponding to each of said messages including bitmapped images of the screen changes; and
    a record supervisor for recording said messages to said first data structure and determining if there is a corresponding screen change and, if so, copying a corresponding bitmapped image of said screen change to said second data structure.

13. The mechanism according to claim 12, further comprising a third data structure for storing information relating to cursor changes, wherein said record supervisor determines if there is a cursor change associated with each of said messages and, if so, stores information relating to said cursor change in said third data structure.

14. The mechanism according to claim 12, wherein screen changes are determined by checking every integer in a bitmap image and deriving a rectangle to go through a top difference, a left most difference, a bottom most difference and a right most difference.

15. The mechanism according to claim 12, wherein screen changes are determined by dividing a screen into sections and checking every integer in each section of a bitmap image and deriving a rectangle to go through a top difference, a left most difference, a bottom most difference, and a right most difference for each section.

\* \* \* \* \*